(12) United States Patent
Kaushik et al.

(10) Patent No.: US 12,526,618 B2
(45) Date of Patent: Jan. 13, 2026

(54) ACCELERATED USER DATA MESSAGING IN A WIRELESS COMMUNICATION NETWORK

(71) Applicant: T-MOBILE INNOVATIONS LLC, Overland Park, KS (US)

(72) Inventors: Subramania Kaushik, Bellevue, WA (US); Vasu Krishnasami, Bellevue, WA (US); Anil Kumar Mariyani, Ashburn, VA (US); Srinivasan Sridharan, Bellevue, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 567 days.

(21) Appl. No.: 17/732,200

(22) Filed: Apr. 28, 2022

(65) Prior Publication Data
US 2023/0354005 A1 Nov. 2, 2023

(51) Int. Cl.
*H04W 8/04* (2009.01)
*H04L 5/00* (2006.01)
*H04W 4/14* (2009.01)
*H04W 88/18* (2009.01)

(52) U.S. Cl.
CPC .............. *H04W 8/04* (2013.01); *H04L 5/0053* (2013.01); *H04W 4/14* (2013.01); *H04W 88/184* (2013.01)

(58) Field of Classification Search
CPC ....... H04W 8/04; H04W 4/14; H04W 88/184; H04L 5/0053
See application file for complete search history.

(56) References Cited

U.S. PATENT DOCUMENTS

| | | | |
|---|---|---|---|
| 10,674,469 B2 | 6/2020 | Kim et al. | |
| 10,687,300 B2 | 6/2020 | Youn et al. | |
| 10,736,072 B2 | 8/2020 | Youn et al. | |
| 10,880,723 B2 | 12/2020 | Kim | |
| 11,096,037 B2 | 8/2021 | Kim et al. | |
| 2019/0306695 A1* | 10/2019 | Kim | H04W 48/17 |
| 2020/0045753 A1 | 2/2020 | Dao et al. | |
| 2020/0213819 A1* | 7/2020 | Kim | H04W 8/183 |
| 2020/0396571 A1* | 12/2020 | Kim | H04W 4/14 |
| 2022/0286993 A1* | 9/2022 | Youn | H04W 8/06 |
| 2022/0353668 A1* | 11/2022 | Qu | H04W 4/14 |
| 2023/0075951 A1* | 3/2023 | Long | H04L 69/40 |

(Continued)

FOREIGN PATENT DOCUMENTS

WO 2021064507 A1 4/2021

*Primary Examiner* — Christopher M Crutchfield
*Assistant Examiner* — Tito Q Pham

(57) ABSTRACT

A wireless communication network transfers a data message to a User Equipment (UE). A wireless network control system registers the UE, and in response, transfers a UE registration notice for the UE and the wireless network control system to a wireless network database system. The wireless network database system receives the UE registration notice, and in response, transfers the UE registration notice to a message center. The message center receives the UE registration notice. The message center receives the data message for the UE, and in response, transfers the data message to the wireless network control system based on the UE registration notice. The wireless network control system receives the data message, and in response, transfers the data message to the UE.

20 Claims, 10 Drawing Sheets

(56) References Cited

U.S. PATENT DOCUMENTS

| | | | |
|---|---|---|---|
| 2023/0209326 A1* | 6/2023 | Merino Vazquez | H04W 8/10 455/435.2 |
| 2023/0308842 A1* | 9/2023 | Long | H04L 67/02 |
| 2024/0089710 A1* | 3/2024 | Rustagi | H04W 4/14 |

* cited by examiner

… (1)

ACCELERATED USER DATA MESSAGING IN A WIRELESS COMMUNICATION NETWORK

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a phone may execute a messaging application that exchanges user messages with other phones over the wireless communication networks.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Short Message Service Functions (SMSFs) Unified Data Management (UDM), Home Subscriber Systems (HSS), and the like.

To receive the messaging service, a wireless user device attaches to a wireless access node and registers with a network control system. The network control system writes data characterizing the registration to a network database system. When a message center receives a data message for the wireless user device, the message center retrieves the network control system address from the network data base system. The message center sends the user data message to the network control system using the address. The network control system sends the user data message to the wireless user device. Unfortunately, the wireless communication networks can take an excessive amount of time to deliver user data messages to users—especially when radio conditions are poor. Moreover, the wireless communication networks often use an inefficient amount of network signaling that wastes network resources and raises costs.

TECHNICAL OVERVIEW

A wireless communication network transfers a data message to a User Equipment (UE). A wireless network control system registers the UE, and in response, transfers a UE registration notice for the UE and the wireless network control system to a wireless network database system. The wireless network database system receives the UE registration notice, and in response, transfers the UE registration notice to a message center. The message center receives the UE registration notice. The message center receives the data message for the UE, and in response, transfers the data message to the wireless network control system based on the UE registration notice. The wireless network control system receives the data message, and in response, transfers the data message to the UE.

DETAILED DESCRIPTION

Figure 1:
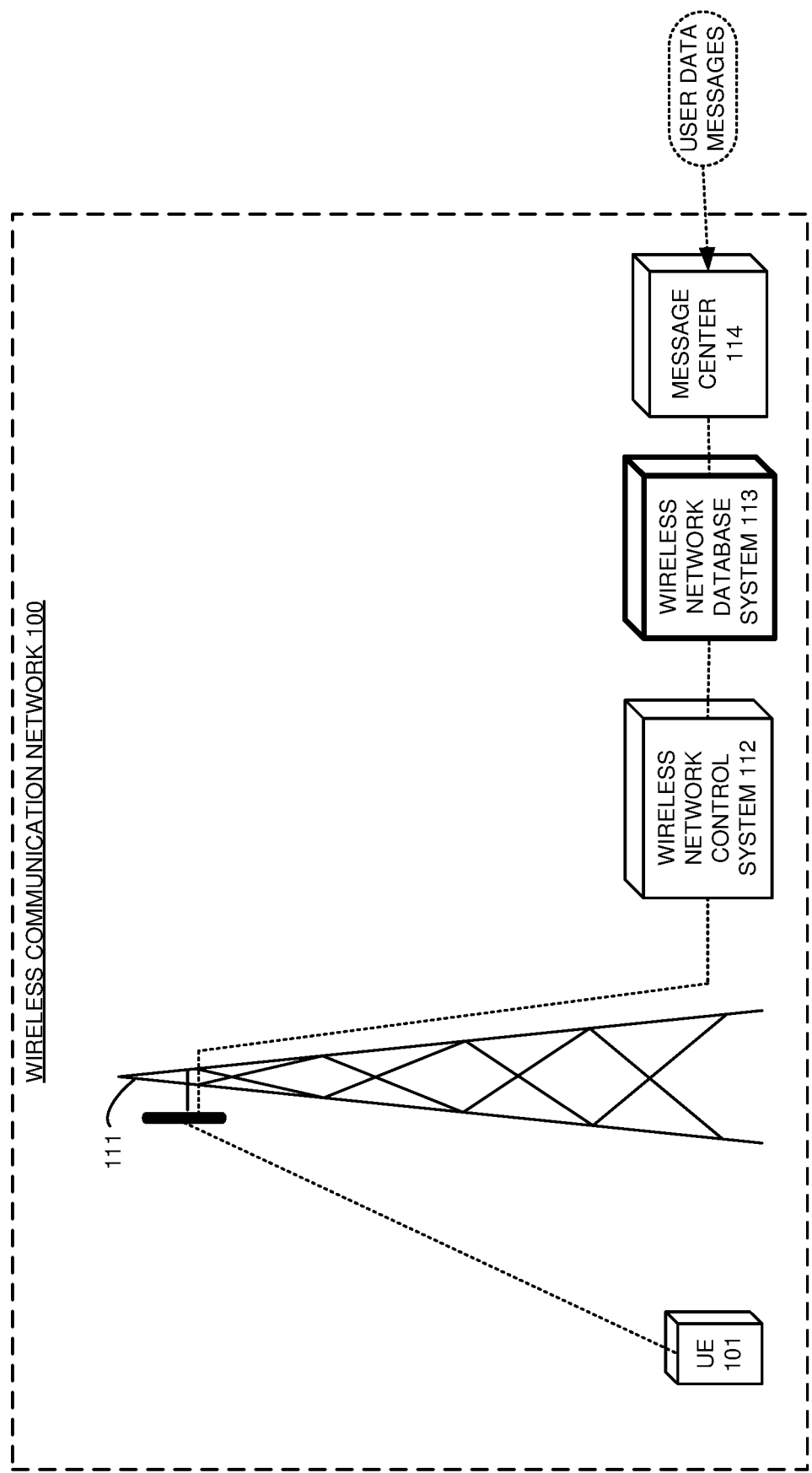
FIG. 1 illustrates an exemplary wireless communication network to transfer data messages to User Equipment (UEs).

FIG. 1 illustrates exemplary wireless communication network 100 to transfer data messages to User Equipment (UE) 101. Wireless communication network 100 comprises UE 101, wireless access node 111, wireless network control system 112, wireless network database system 113, and message center 114. UE 101 comprises a computer, phone, sensor, vehicle, robot, or some other data appliance with data communication circuitry. The number of UEs and access nodes shown on FIG. 1 is restricted for clarity and wireless communication network 100 typically includes many more UEs and access nodes than shown.

Various examples of network operation and configuration are described herein. In some examples, UE 101 registers with wireless network control system 112 over wireless access node 111, and in response to the registration, wireless network control system 112 transfers a UE registration notice for UE 101 and wireless network control system 112 to wireless network database system 113. Wireless network database system 113 receives the UE registration notice, and in response, transfers the UE registration notice for UE 101 and wireless network control system 112 to message center 114. Message center 114 receives a data message for UE 101, and in response, transfers the data message to wireless network control system 112 based on the UE registration notice. Wireless network control system 112 receives the data message, and in response, transfers the data message to UE 101 over wireless access node 111.

In some examples, wireless network control system 112 comprises a Short Message Service Function (SMSF). Wireless network database system 113 comprises a Unified Data Management (UDM) and a Home Subscriber System (HSS). Message center 114 comprises a Short Message Service Center (SMSC). The SMSF registers UE 101 and transfers the UE registration notice for UE 101 and the SMSF to the UDM. The UDM transfers the UE registration notice to a Unified Data Repository (UDR) and receives an acknowledgement from the UDR. In response to the acknowledgement from the UDR, the UDM transfers the UE registration notice to the HSS. Advantageously, the HSS does not have to subscribe to the UDM for the UE registration notice. In response to the UE registration notice, the HSS transfers an alert for UE 101 to the SMSC, and the SMSC transfers an SMSF request for UE 101 to the HSS. The HSS transfers the SMSF request for UE 101 to the UDR, and the UDR transfers an SMSF identifier for the SMSF to the HSS. The HSS transfers the SMSF identifier for the SMSF to the SMSC. The SMSC receives an SMS message for UE 101, and in response, transfers the SMS message to the SMSF based on the SMSF identifier. The SMSF transfers the data message to UE 101.

In some examples, wireless network control system 112 comprises an Access and Mobility Management Function (AMF), and wireless network database system 113 comprises a UDM and an HSS. During an AMF-switch from one AMF to another, the new AMF re-registers UE 101 and transfers a UE re-registration notice for UE 101 and the new AMF to the UDM. The UDM transfers the UE re-registration notice to a UDR and receives an acknowledgement from the UDR. In response to the acknowledgement from the UDR, the UDM transfers the UE re-registration notice to the HSS—and the HSS did not previously subscribe to the UDM for the UE re-registration notice. In response to the UE re-registration notice, the HSS transfers an alert for UE 101 to message center 114, and message center 114 transfers an AMF request for UE 101 to the HSS. The HSS transfers the AMF request for UE 101 to the UDR, and the UDR transfers an AMF identifier for the AMF to the HSS. The HSS transfers the AMF identifier for the AMF to message center 114.

Advantageously, wireless communication network 100 accelerates the delivery of the data messages to improve the messaging service for the end-users. Moreover, wireless communication network 100 eliminates network signaling to conserve network resources and lower costs.

UE 101 and wireless access node 111 comprise radios and wirelessly communicate using a wireless protocol like Fifth Generation New Radio (5GNR), Institute of Electrical and Electronic Engineers (IEEE) 802.11 (WIFI), Long Term Evolution (LTE), Bluetooth Low Energy (BLE), Internet-of-Things (IoT), and Low-Power Wide Area Network (LP-WAN). UE 101, wireless access node 111, wireless network control system 112, wireless network database system 113, and message center 114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication network 100 as described herein.

Figure 2:
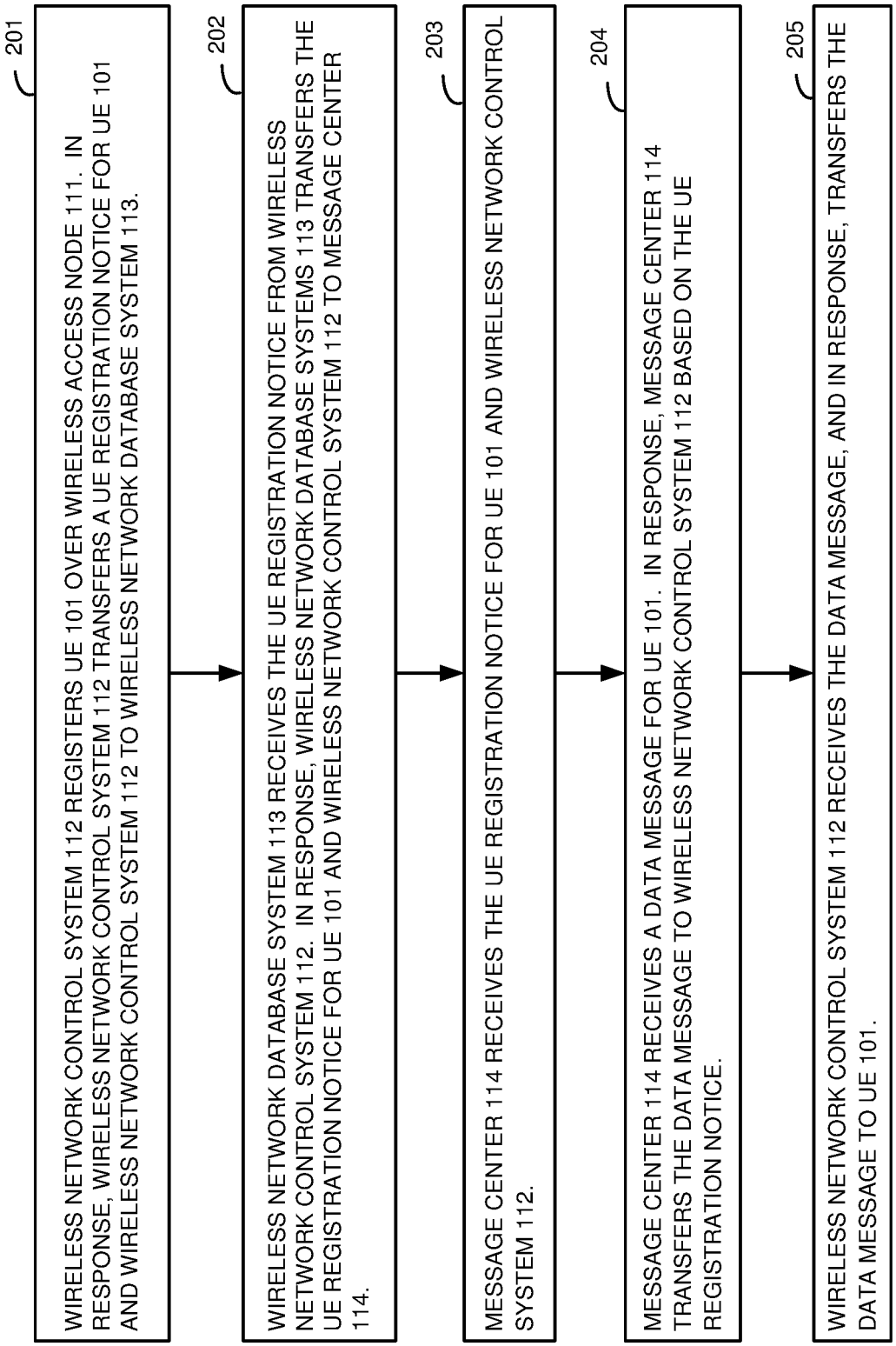
FIG. 2 illustrates an exemplary operation of the wireless communication network to transfer the data messages to the UEs.

FIG. 2 illustrates an exemplary operation of wireless communication network 100 to transfer the data messages to UE 101. The operation may differ in other examples. Wireless network control system 112 registers UE 101 over wireless access node 111, and in response, wireless network control system 112 transfers a UE registration notice for UE 101 and wireless network control system 112 to wireless network database system 113 (201). Wireless network database system 113 receives the UE registration notice, and in response, transfers the UE registration notice for UE 101 and wireless network control system 112 to message center 114 (202). Message center 114 receives the UE registration notice for UE 101 and wireless network control system 112 (203). Message center 114 receives a data message for UE 101, and in response, transfers the data message to wireless network control system 112 based on the UE registration notice (204). Wireless network control system 112 receives the data message, and in response, transfers the data message to UE 101 (205).

Figure 3:
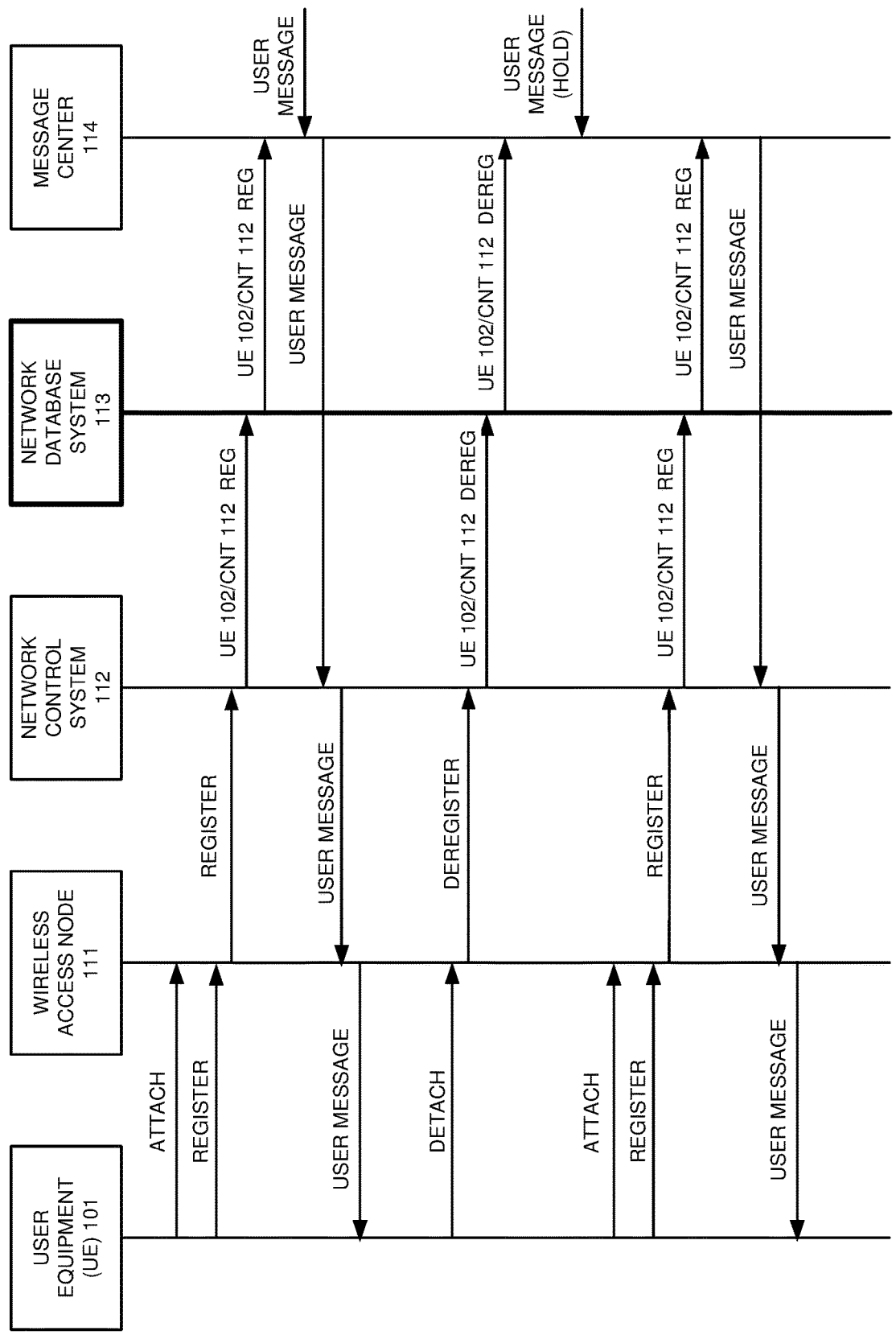
FIG. 3 illustrates an exemplary operation of the wireless communication network to transfer the data messages to the UEs.

FIG. 3 illustrates an exemplary operation of wireless communication network 100 to transfer the data messages to UEs 101. The operation may differ in other examples. UE 101 wirelessly attaches to wireless access node 111. UE 101 registers with wireless network control system 112 over wireless access node 111. Wireless network control system 112 registers UE 101 and responsively transfers a UE registration notice for UE 101 and wireless network control system (CNT) 112 to wireless network database system 113. Wireless network database system 113 receives the UE registration notice and responsively transfers the UE registration notice for UE 101 and wireless network control system 112 to message center 114. Message center 114 receives the UE registration notice for UE 101 and wireless network control system 112. Advantageously, wireless network database system 113 does not wait like prior systems for a user data message to arrive at message center 114 before sending the UE registration notice to message center 114. Message center 114 then receives the user data message for UE 101 and responsively transfers the user data message to wireless network control system 112 based on the UE registration notice without waiting. Wireless network control system 112 transfers the user data message to UE 101.

UE 101 wirelessly detaches from wireless access node 111, and wireless access node 111 deregisters UE 101 from wireless network control system 112. Wireless network control system 112 responsively transfers a UE deregistration notice for UE 101 and wireless network control system 112 to wireless network database system 113. Wireless network database system 113 receives the UE deregistration notice and responsively transfers the UE deregistration notice for UE 101 and wireless network control system 112 to message center 114. Message center 114 receives the UE deregistration notice for UE 101 and wireless network control system 112.

Message center 114 then receives another user data message for UE 101 and responsively holds the user data message in a queue until UE 101 reappears. Advantageously, wireless network database system 113 does not consume resources by making a subscription for UE 101 information from wireless network control system 112. Eventually, UE 101 wirelessly reattaches to wireless access node 111. UE 101 reregisters with wireless network control system 112 over wireless access node 111. Wireless network control system 112 reregisters UE 101 and responsively transfers a UE registration notice for UE 101 and wireless network control system 112 to wireless network database system 113. Wireless network database system 113 receives the UE registration notice and responsively transfers the UE registration notice for UE 101 and wireless network control system 112 to message center 114. Message center 114 receives the UE registration notice for UE 101 and wireless network control system 112. Message center 114 responsively transfers the waiting user data message from the queue to wireless network control system 112 based on the UE registration notice. Wireless network control system 112 transfers the user data message to UE 101.

Figure 4:
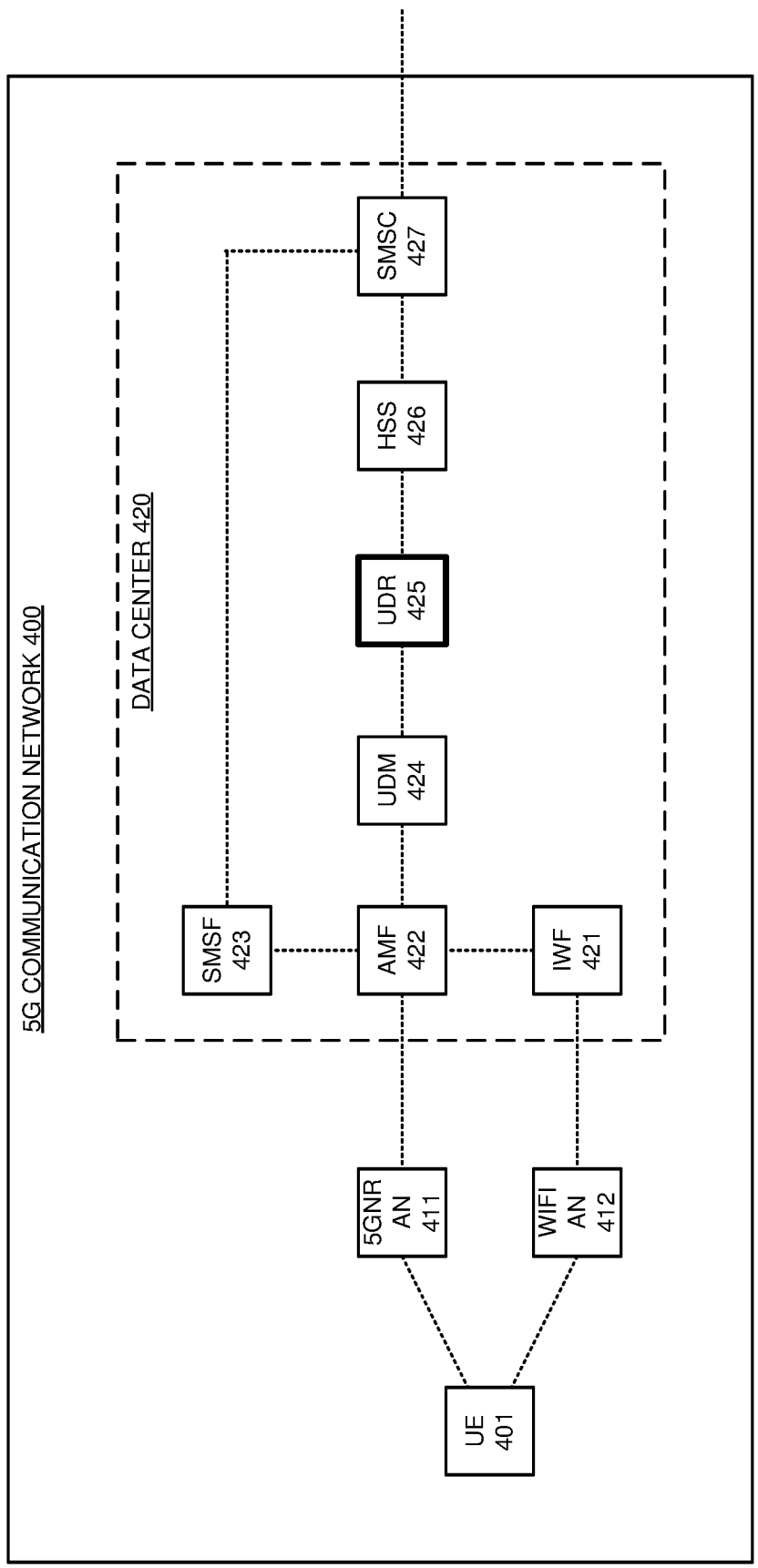
FIG. 4 illustrates an exemplary Fifth Generation (5G) communication network that transfers Short Message Service (SMS) messages to wireless UEs.

FIG. 4 illustrates exemplary Fifth Generation (5G) communication network 400 that transfers Short Message Service (SMS) messages to wireless UE 401. 5G communication network 400 comprises an example of wireless communication network 100, although network 100 may differ. 5G communication network 400 comprises: UE 401, 5GNR AN 411, WIFI AN 412, and network data center 420. Network data center 420 comprises Interworking Function (IWF) 421, Access and Mobility Management Function (AMF) 422, Short Message Service Function (SMSF) 423, Unified Data Management (UDM) 424, Unified Data Repository (UDR) 425, Home Subscriber System (HSS) 426, and Short Message Service Center (SMSC) 427. Network data center 420 typically includes additional network functions like Network Exposure Function (NEF) that are omitted for clarity.

UE 401 wirelessly attaches to WIFI AN 412. UE 401 interacts with IWF 421 over WIFI AN 412 to establish secure communications. UE 401 registers with AMF 422 over WIFI AN 412 and IWF 421. AMF 422 authenticates UE 401 through a Subscriber Identity Module (SIM) code verification. AMF 422 establishes a Third Generation Partnership Project (3GPP) Ni link to UE 401. In response to the UE registration, AMF 422 notifies UDM 424 of the UE 401-AMF 422 registration. UDM 424 writes the UE 401-AMF 422 registration to UDR 425, and UDR 425 acknowledges the successful write operation to UDM 424.

During the above registration, UE 401 signals AMF 421 that it supports the SMS service delivered by SMSF 423, and in response, AMF 422 registers UE 401 with SMSF 423. In response to the UE registration, SMSF 423 notifies UDM 424 of the UE 401-SMSF 423 registration. UDM 424 writes the UE 401-SMSF 423 registration to UDR 425, and UDR 425 acknowledges the successful write operation to UDM 424. In response to the acknowledgement from UDR 425, UDM 424 alerts HSS 426 of the SMSF registration for UE 401. In response to the alert from UDM 424, HSS 426 alerts SMSC 427 of the SMSF registration for UE 401. In response to the SMSF registration for UE 401, SMSC 427 requests SMSF information for UE 401 from HSS 426. In response to the SMSC 427 request, HSS 426 retrieves the address for SMSF 423 from UDR 425. Advantageously, SMSC 427 has the address of SMSF 423 for UE 401 if needed. SMSC 427 receives an SMS message for UE 401 and transfers the SMS message to SMSF 423. Advantageously, SMSC 427 does not wait for HSS 426 to retrieve the address for SMSF 423 before sending the SMS message to SMSF 423. SMSF 423 transfers the SMS message to AMF 422. AMF 422 transfers the SMS message to UE 401 over IWF 421 and WIFI AN 412. UE 401 may wirelessly attach to and use 5GNR AN 411 for SMS messaging in a similar manner to WIFI AN 412 and IWF 421.

In some examples, UE 401 switches from a source AMF (not shown) to target AMF 422. For example, UE 401 may be redirected from the source AMF to target AMF 422 in response to AMF load-balancing, AMF performance issues, UE handovers between different networks, and the like. UE 401 re-registers with AMF 422 over WIFI AN 412 and IWF 421. In response to the UE re-registration, AMF 422 notifies UDM 424 of the UE 401-AMF 422 re-registration. UDM 424 writes the UE 401-AMF 422 re-registration to UDR 425, and UDR 425 acknowledges the successful write operation to UDM 424. In response to the acknowledgement from UDR 425, UDM 424 alerts HSS 426 of the AMF re-registration for UE 401. In response to the alert from UDM 424, HSS 426 alerts SMSC 427 of the AMF re-registration for UE 401. In response to the AMF re-registration for UE 401, SMSC 427 requests AMF information for UE 401 from HSS 426. In response to the SMSC 427 request, HSS 426 retrieves the address for AMF 422 from UDR 425. Advantageously, SMSC 427 has the address of AMF 422 for UE 401 if needed.

Figure 5:
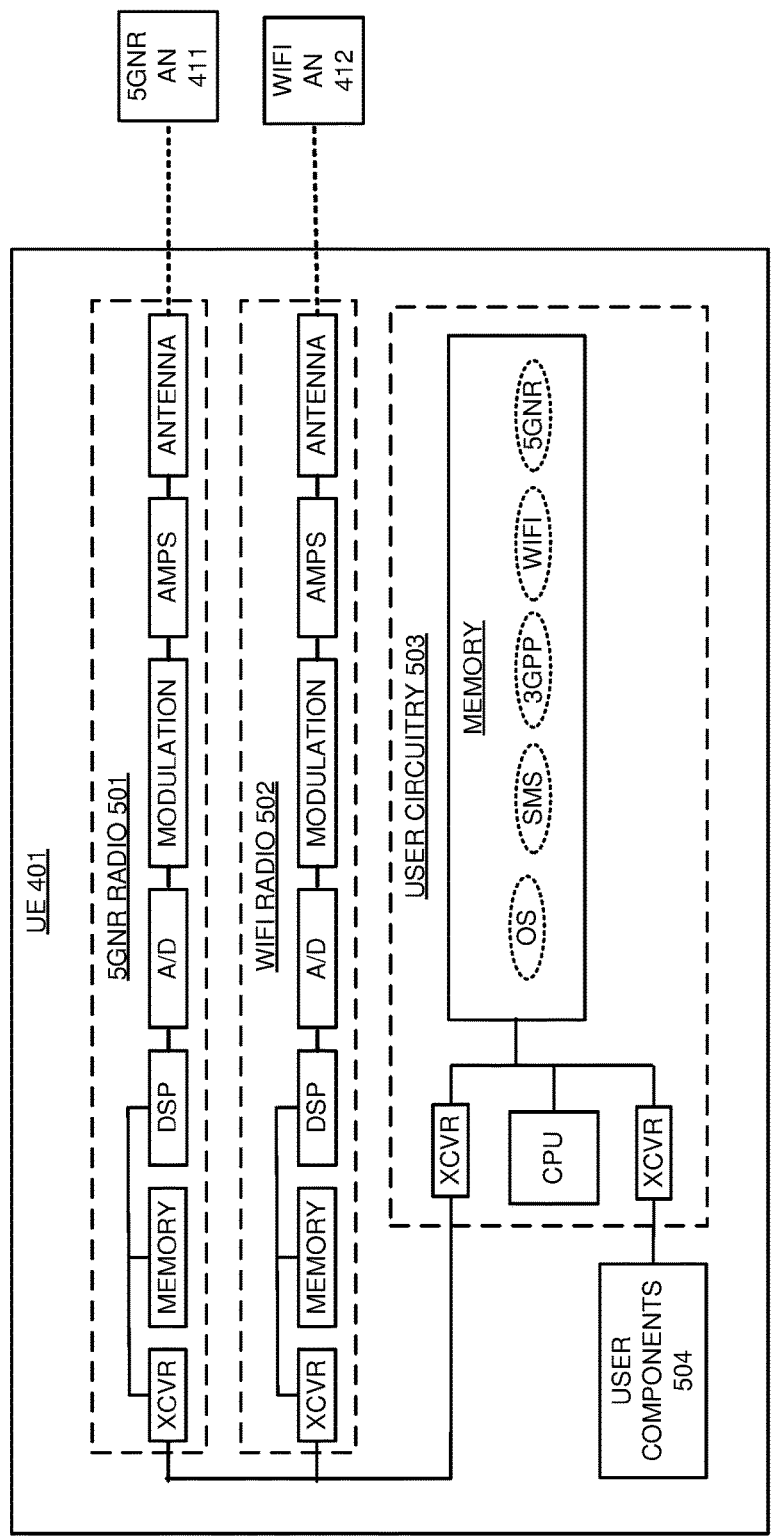
FIG. 5 illustrates an exemplary wireless UE in the 5G communication network.

FIG. 5 illustrates exemplary wireless UE 401 in 5G communication network 400. Wireless UE 401 comprises an example of wireless UE 101, although UE 101 may differ. Wireless UE 401 comprises 5GNR radio 501, WIFI radio 502, user circuitry 503, and user components 504. User components 504 comprise sensors, controllers, displays, or some other user apparatus that generates and/or consumes user data. Radios 501-502 each comprise an antenna, amplifiers, filters, modulation, analog-to-digital interfaces, DSP, memory, and transceivers that are coupled over bus circuitry. User circuitry 503 comprises CPU, memory, and transceivers (XCVRs) that are coupled over bus circuitry. The memory in user circuitry 503 stores an operating system (OS), SMS application (SMS), network application (3GPP), WIFI application (WIFI), and 5GNR application (5GNR). The transceivers in radios 501-502 are coupled to a transceiver in user circuitry 503. The transceiver in user circuitry 503 is coupled to user components 504. The CPU in user circuitry 503 executes the operating system, SMS, WIFI, 5GNR, and 3GPP applications to exchange network signaling and SMS messages with ANs 411-412 over radios 501-502.

Figure 6:
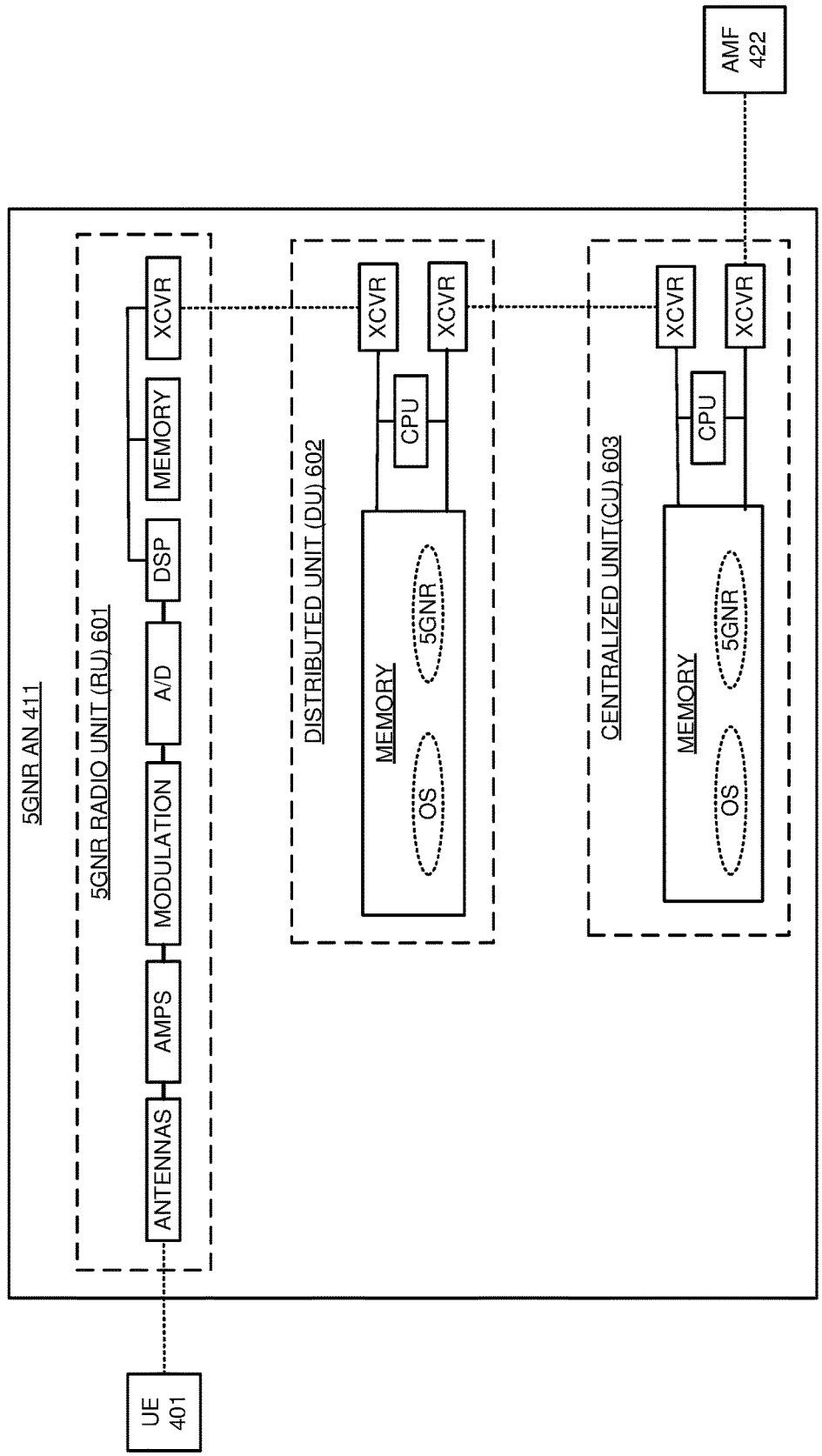
FIG. 6 illustrates exemplary an 5G New Radio (NR) Access Node (AN) in the 5G communication network.

FIG. 6 illustrates exemplary 5G New Radio (NR) Access Node (AN) 411 in 5G communication network 400. 5GNR AN 411 comprises an example of wireless access node 111, although access node 111 may differ. 5GNR AN 411 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to UE 401 over 5GNR links. Transceivers in 5GNR RU 601 are coupled to transceivers in DU 602. Transceivers in DU 602 are coupled to transceivers in CU 603. Transceivers in CU 603 are coupled AMF 422. The DSP and CPU in RU 601, DU 602, and CU 603 execute the radio applications, operating systems, and network applications to exchange the signaling and SMS messages between UE 401 and AMF 422.

Figure 7:
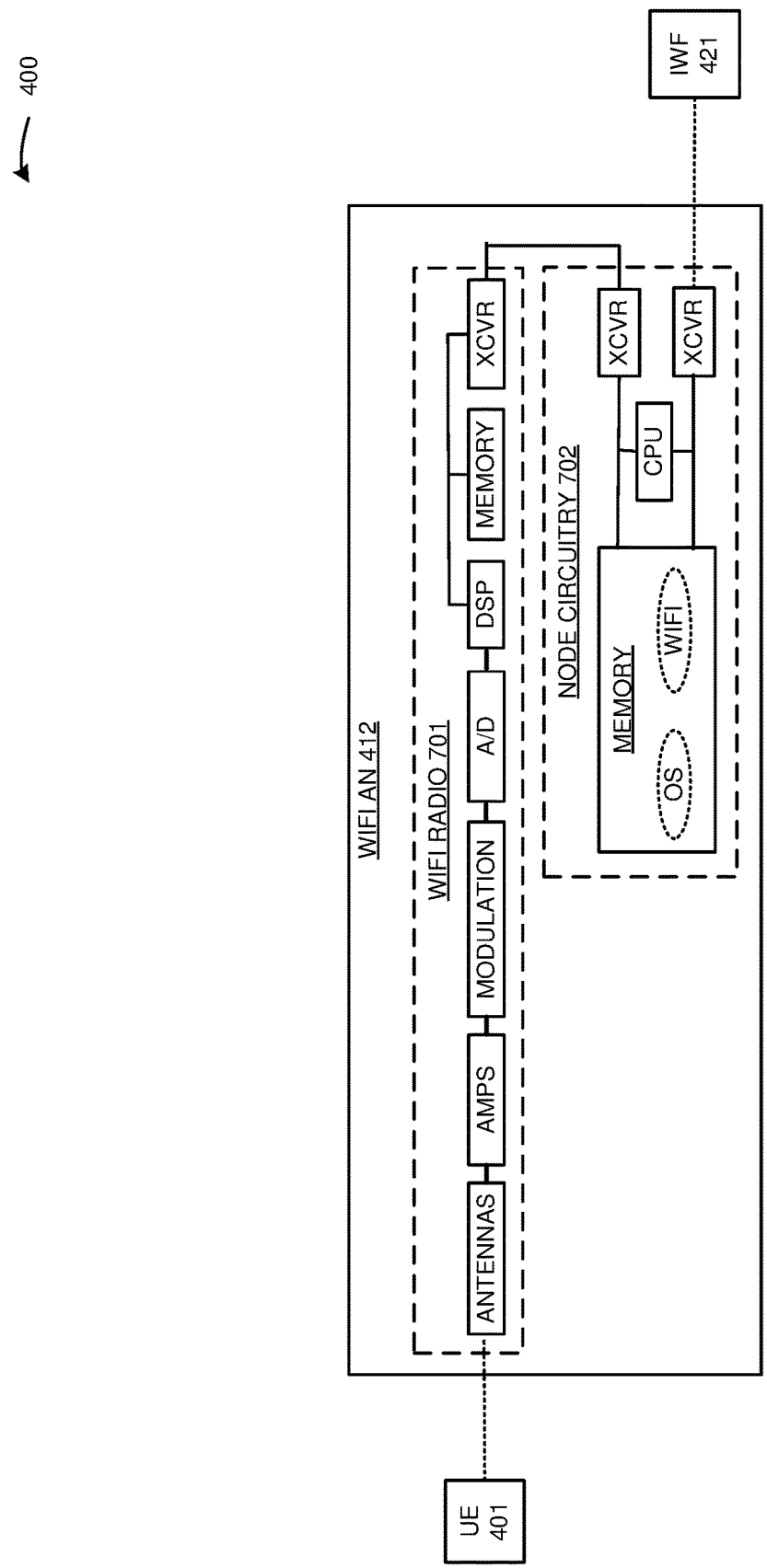
FIG. 7 illustrates an exemplary IEEE 802.11 (WIFI) AN in the 5G communication network.

FIG. 7 illustrates exemplary IEEE 802.11 (WIFI) AN 412 in 5G communication network 400. WIFI AN 412 comprises an example of wireless access node 111, although access node 111 may differ. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to wireless UE 401 over WIFI links. Transceivers in WIFI radio 701 are coupled to transceivers in node circuitry 702. Transceivers in node circuitry 702 are coupled to transceivers in IWF 421. The CPU in node circuitry 702 executes the operating system and network applications to exchange the signaling and SMS messages between UE 401 and AMF 422.

Figure 8:
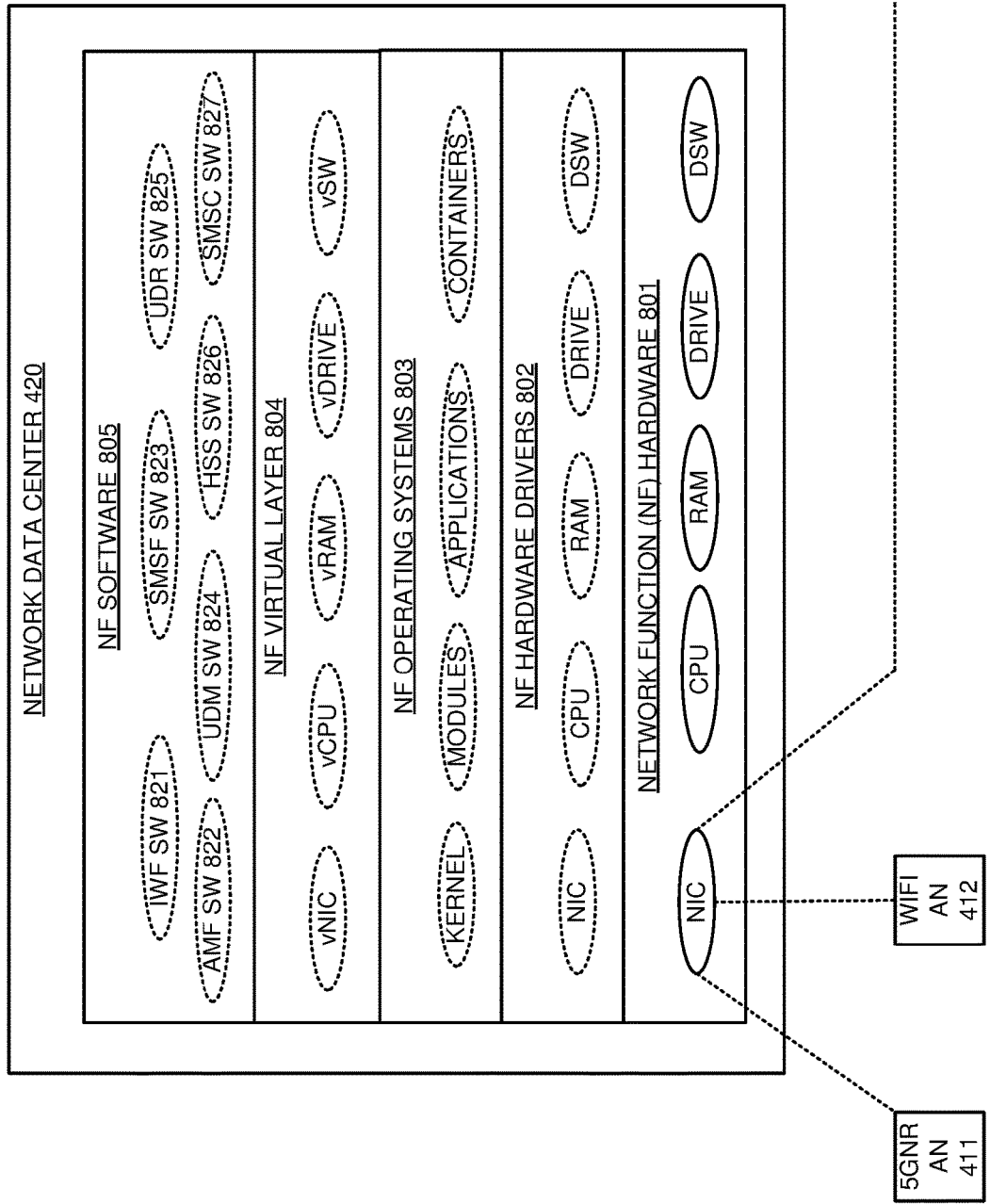
FIG. 8 illustrates an exemplary data center in the 5G communication network.

FIG. 8 illustrates an exemplary data center 420 in 5G communication network 400. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SW 821, AMF SW 822, SMSF SW 823, UDM SW 824, UDR SW 825, HSS SW 826, and SMSC SW 827. Other NF SW like Network Repository Function (NRF) SW are typically present but are omitted for clarity. Network data center 420 may be located at a single site or be distributed across multiple geographic locations. The NIC in NF hardware 801 are coupled to 5GNR AN 411, WIFI AN 412, and external systems. NF hardware 801 executes NF hardware drivers 802, NF operating systems 803, NF virtual layer 804, and NF SW 805 to form and operate IWF 421, AMF 422, SMSF 423, UDM 424, UDR 425, HSS 426, and SMSC 427.

Figure 9:
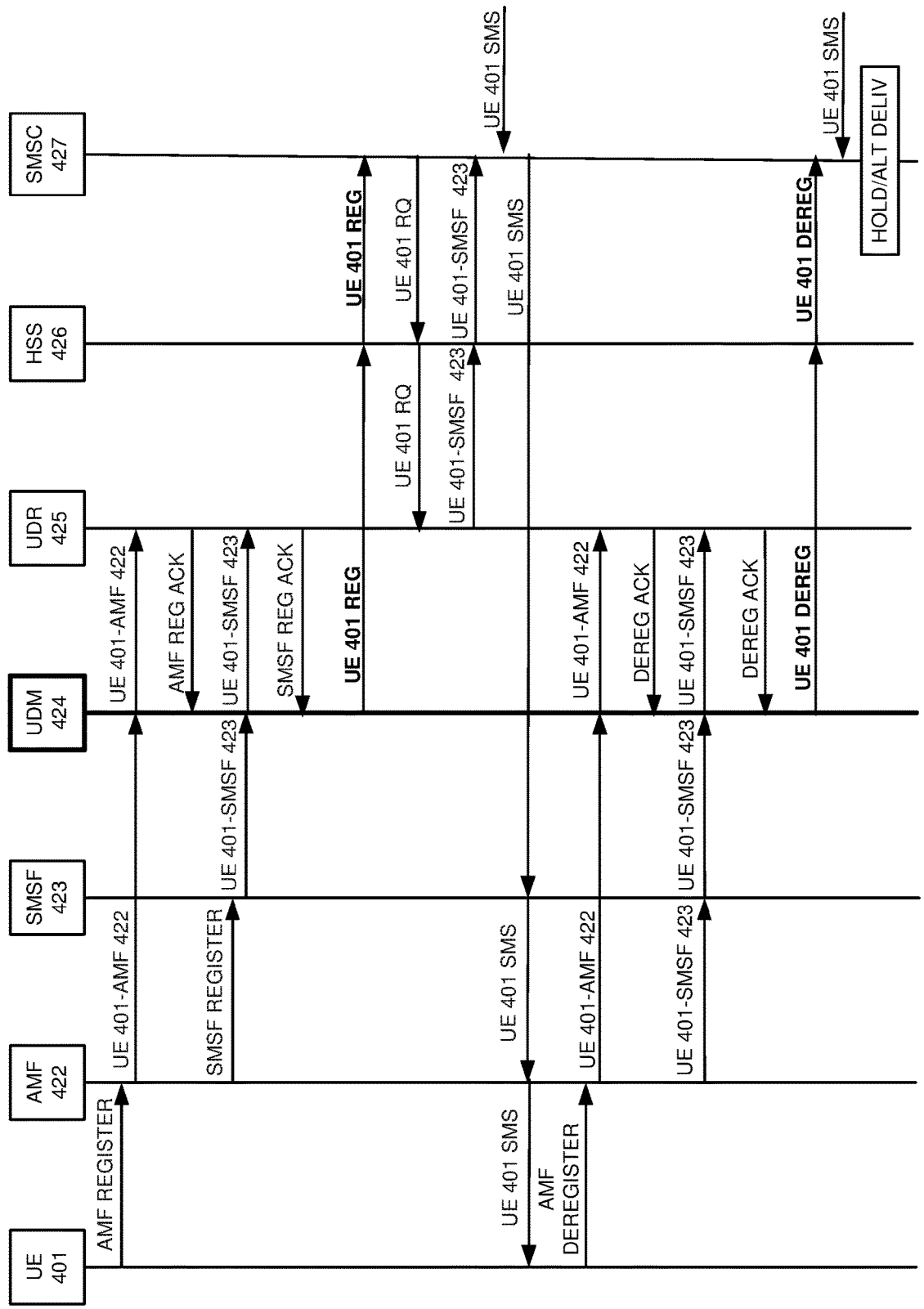
FIG. 9 illustrates an exemplary operation of the 5G communication network to transfer the SMS messages to the UEs.

FIG. 9 illustrates an exemplary operation of 5G communication network 400 to transfer the SMS messages to UE 401. The operation may differ in other examples. UE 401 registers with AMF 422 over 5GNR AN 411 or WIFI AN 412 and IWF 421 (the ANs are not shown on FIGS. 9-10). In response to the UE registration, AMF 422 notifies UDM 424 of the UE 401-AMF 422 registration. UDM 424 writes the UE 401-AMF 422 registration to UDR 425. UDR 425 acknowledges (ACK) the successful write operation to UDM 424. During the above registration, UE 401 signals AMF 421 that it supports the SMS service delivered by SMSF 423, and in response, AMF 422 registers UE 401 with SMSF 423. In response to the UE registration, SMSF 423 notifies UDM 424 of the UE 401-SMSF 423 registration. UDM 424 writes the UE 401-SMSF 423 registration to UDR 425, and UDR 425 acknowledges the successful write operation to UDM 424. In response to the acknowledgement from UDR 425, UDM 424 alerts HSS 426 of the SMSF registration for UE 401. In response to the alert from UDM 424, HSS 426 alerts SMSC 427 of the SMSF registration for UE 401. In response to the SMSF registration for UE 401, SMSC 427 requests SMSF information for UE 401 from HSS 426. In response to the SMSC 427 request, HSS 426 retrieves the address for SMSF 423 from UDR 425.

Advantageously, SMSC 427 has the address of SMSF 423 for UE 401 if needed. SMSC 427 receives an SMS message for UE 401 and transfers the SMS message to SMSF 423. Advantageously, SMSC 427 does not wait for HSS 426 to retrieve the address for SMSF 423 before sending the SMS message to SMSF 423. SMSF 423 transfers the SMS message to AMF 422. AMF 422 transfers the SMS message to UE 401 over 5GNR AN 411 or over IWF 421 and WIFI AN 412.

UE 401 detaches from 5GNR AN 411 or WIFI AN 412 (not shown) which eventually deregisters UE 401 from AMF 422. In response to the UE deregistration, AMF 422 notifies UDM 424 of the UE 401-AMF 422 deregistration. UDM 424 writes the UE 401-AMF 422 deregistration to UDR 425. UDR 425 acknowledges the successful write operation to UDM 424. Further in response to the UE deregistration, AMF 422 notifies SMSF 423 of the UE deregistration. SMSF 423 writes the UE 401-SMSF 423 deregistration to UDR 425. UDR 425 acknowledges the successful write operation to UDM 424. In response to the acknowledgement from UDR 425, UDM 424 alerts HSS 426 of the SMSF deregistration for UE 401. In response to the alert from UDM 424, HSS 426 alerts SMSC 427 of the SMSF deregistration for UE 401. Subsequently, SMSC 427 receives an SMS message for UE 401. In response to the deregistration alert for UE 401, SMSC 427 holds the SMS message for UE 401 in queue. When UE 401 registers again, the above-described operation is repeated to alert SMSC 427 and send the held SMS message to UE 401. Alternate delivery may be used.

Figure 10:
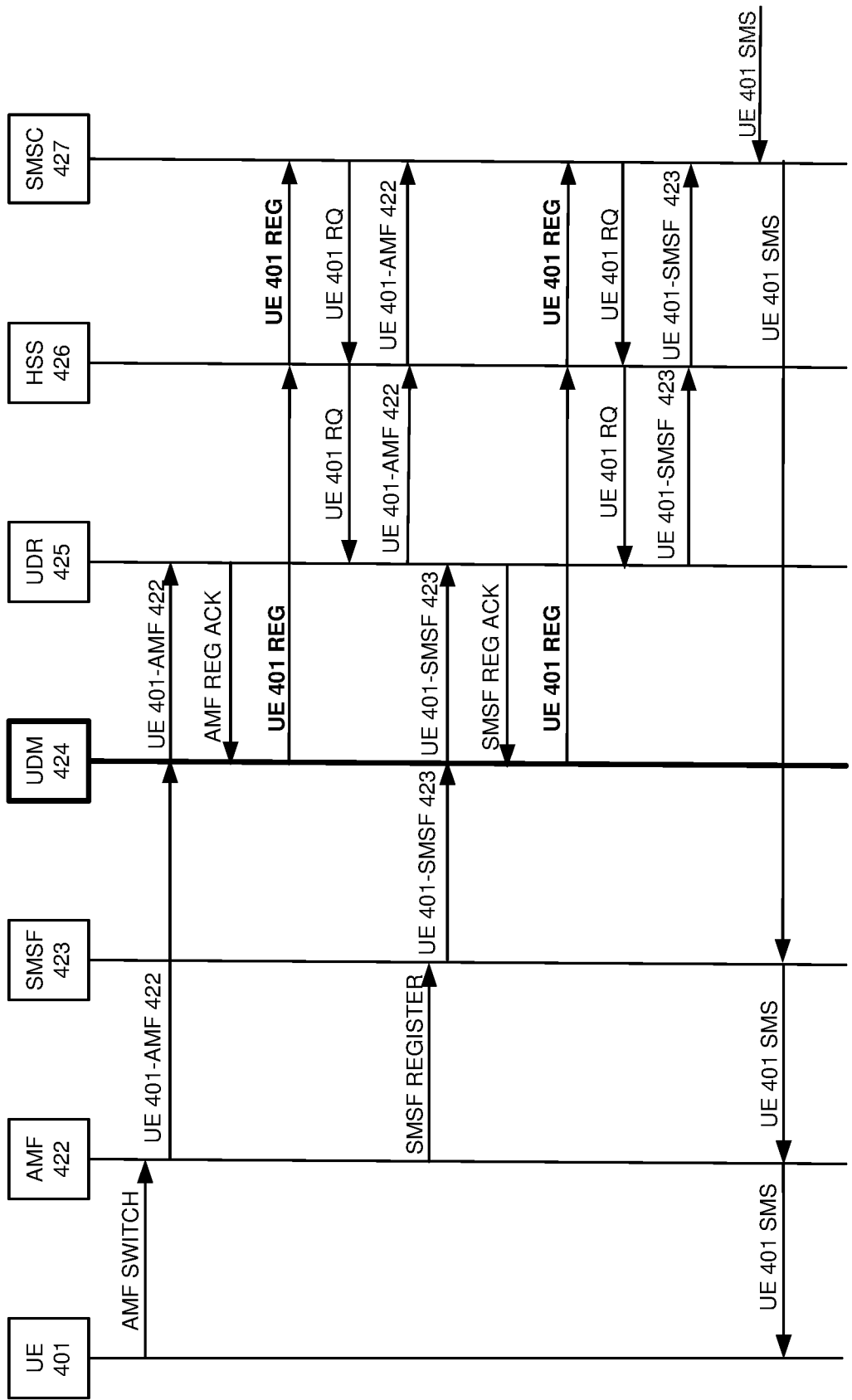
FIG. 10 illustrates an exemplary operation of the 5G communication network to transfer the SMS messages to the UEs.

FIG. 10 illustrates an exemplary operation of 5G communication network 400 to transfer the SMS messages to UE 401. The operation may differ in other examples. Initially, UE 401 is registered with another AMF (not shown) and then UE 401 switches to AMF 422. The AMF switch may be in response to an AMF overload, AMF fault, UE network change, or some other network event. In response to the re-registration by UE 401, AMF 422 notifies UDM 424 of the UE 401-AMF 422 re-registration. UDM 424 writes the UE 401-AMF 422 re-registration to UDR 425. UDR 425 acknowledges the successful write operation to UDM 424. In response to the acknowledgement from UDR 425, UDM 424 alerts HSS 426 of the AMF re-registration for UE 401. In response to the alert from UDM 424, HSS 426 alerts SMSC 427 of the AMF re-registration for UE 401. In response to the AMF registration for UE 401, SMSC 427 requests AMF information for UE 401 from HSS 426. In response to the SMSC 427 request, HSS 426 retrieves the address for AMF 422 from UDR 425. Advantageously, SMSC 427 has the address of AMF 422 for UE 401 if needed.

During the above registration, UE 401 signals AMF 421 that it supports the SMS service delivered by SMSF 423, and in response, AMF 422 registers UE 401 with SMSF 423. In response to the UE registration, SMSF 423 notifies UDM 424 of the UE 401-SMSF 423 registration. UDM 424 writes the UE 401-SMSF 423 registration to UDR 425, and UDR 425 acknowledges the successful write operation to UDM 424. In response to the acknowledgement from UDR 425, UDM 424 alerts HSS 426 of the SMSF registration for UE 401. In response to the alert from UDM 424, HSS 426 alerts SMSC 427 of the SMSF registration for UE 401. In response to the SMSF registration for UE 401, SMSC 427 requests SMSF information for UE 401 from HSS 426. In response to the SMSC 427 request, HSS 426 retrieves the address for SMSF 423 from UDR 425. Advantageously, HSS 426 does not need to make subscriptions from UDM 424 to obtain this data. SMSC 427 transfers the SMS message from the queue to SMSF 423. SMSF 423 transfers the SMS message to AMF 422. AMF 422 transfers the SMS message to UE 401 over 5GNR AN 411 or over IWF 421 and WIFI AN 412.

The wireless data network circuitry described above comprises computer hardware and software that form special-purpose wireless communication network circuitry to accelerate the transfer of data message to user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication network circuitry to accelerate the transfer of data message to user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to transfer a data message to a User Equipment (UE), the method comprising:
    a Short Message Service Function (SMFS) registering the UE, and in response to registering the UE, transferring a UE registration notice for the UE and the SMSF to a Unified Data Management (UDM);
    the UDM receiving the UE registration notice for the UE and the SMSF from the SMSF and responsively transferring the UE registration notice to a Home Subscriber System (HSS);
    the HSS receiving the UE registration notice, and in response to receiving the UE registration notice, transferring a UE alert to a Short Message Service Center (SMSC);
    the SMSC receiving the UE alert from the HSS and responsively transferring an SMSF request for the UE to the HSS;
    the HSS receiving the SMSF request for the UE from the SMSC and responsively transferring the SMSF request for the UE to a Unified Data Repository (UDR);
    the UDR receiving the SMSF request for the UE from the HSS and responsively transferring an SMSF identifier for the SMSF to the HSS;
    the HSS receiving the SMSF identifier for the SMSF from the UDR and responsively transferring the SMSF identifier for the SMSF to the SMSC;
    the SMSC receiving a data message for the UE, and in response to receiving the data message, transferring the data message to the SMSF based on the SMSF identifier; and
    the SMSF receiving the data message, and in response to receiving the data message, transferring the data message to the UE.

2. The method of claim 1 wherein the UDM receiving the UE registration notice for the UE and the SMSF from the SMSF and responsively transferring the UE registration notice to the HSS comprises the UDM receiving the UE registration notice and responsively transferring the UE registration notice to the UDR and responsively receiving an acknowledgement from the UDR, and in response to the acknowledgement from the UDR, transferring the UE registration notice to the HSS.

3. The method of claim 1 wherein the UDM receiving the UE registration notice for the UE and the SMSF from the SMSF and responsively transferring the UE registration notice to the HSS comprises the UDM receiving the UE registration notice for the UE and the SMSF from the SMSF and responsively transferring the UE registration notice to the HSS without the HSS previously subscribing to the UDM for delivery of the UE registration notice.

4. The method of claim 1 wherein the UE detaches from the wireless communication network after receiving the data message; and further comprising:
    the SMSF deregistering the UE in response to the UE detaching from the wireless communication network and in response, writing a UE deregistration notice for the UE and the SMSF to the UDR;
    the UDR acknowledging the writing of the UE deregistration notice to the UDM;
    the UDM transferring a UE deregistration alert to the HSS in response to the acknowledging;
    the HSS receiving the UE deregistration alert from the UDM and responsively transferring the UE deregistration alert to the SMSC; and
    the SMSC receiving a subsequent data message for the UE, and in response, holding the subsequent data message for the UE in a queue based on the UE deregistration alert.

5. The method of claim 4 wherein the UE reattaches to the wireless communication network subsequent to deregistration; and further comprising:
    the SMSF reregistering the UE, and in response, transferring a new UE registration notice for the UE and the SMSF to the UDM;
    the UDM receiving the new UE registration notice for the UE and the SMSF from the SMSF and responsively transferring the new UE registration notice to the HSS;
    the HSS receiving the new UE registration notice and responsively transferring a new UE alert to the SMSC in response to the new UE registration notice;
    the SMSC receiving the new UE alert from the HSS and responsively transferring a new SMSF request for the UE to the HSS;
    the HSS receiving the new SMSF request for the UE from the SMSC and responsively transferring the new SMSF request for the UE to the UDR;
    the UDR receiving the new SMSF request for the UE from the HSS and responsively transferring the SMSF identifier for the SMSF to the HSS;
    the HSS receiving the SMSF identifier for the SMSF from the UDR and responsively transferring the SMSF identifier for the SMSF to the SMSC;

the SMSC transferring the subsequent data message held in the queue to the SMSF based on the SMSF identifier; and the SMSF receiving the subsequent data message, and in response, transferring the subsequent data message to the UE.

6. The method of claim 1 further comprising an Access and Mobility Management Function (AMF) registering the UE and receiving signaling from the UE that indicates the UE supports Short Message Service (SMS) service delivered by the SMSF; and wherein:
the SMSF registering the UE comprises the AMF registering the UE with the SMSF based on the signaling.

7. The method of claim 1 wherein the SMSF transferring the data message to the UE comprises the SMSF transferring the data message to the UE via at least one of a Fifth Generation New Radio (5GNR) access node or a WiFi access node.

8. A wireless communication network to transfer a data message to a User Equipment (UE), the wireless communication network comprising:
wireless network circuitry configured to execute a Short Message Service Function (SMSF), a Unified Data Management (UDM), a Home Subscriber System (HSS), a Unified Data Repository (UDR), and a Short Message Service Center (SMSC);
the SMSF configured to register the UE, and in response to registering the UE, transfer a UE registration notice for the UE and the SMSF to the UDM;
the UDM configured to receive the UE registration notice for the UE and the SMSF from the SMSF and responsively transfer the UE registration notice to the HSS;
the HSS configured to receive the UE registration notice, and in response to receiving the UE registration notice, transfer a UE alert to the SMSC;
the SMSC configured to receive the UE alert from HSS and responsively transfer an SMSF request for the UE to the HSS;
the HSS further configured to receive the SMSF request for the UE from the SMSC and responsively transfer the SMSF request for the UE to the UDR;
the UDR configured to receive the SMSF request for the UE from the HSS and responsively transfer an SMSF identifier for the SMSF to the HSS;
the HSS further configured to receive the SMSF identifier for the SMSF from the UDR and responsively transfer the SMSF identifier for the SMSF to the SMSC;
the SMSC further configured to receive a data message for the UE, and in response to receiving the data message, transfer the data message to the SMSF based on the SMSF identifier; and
the SMSF further configured to receive the data message, and in response to receiving the data message, transfer the data message to the UE.

9. The wireless communication network of claim 8 wherein the UDM is further configured to receive the UE registration notice and responsively transfer the UE registration notice to the UDR and responsively receive an acknowledgement from the UDR, and in response to the acknowledgement from the UDR, transfer the UE registration notice to the HSS.

10. The wireless communication network of claim 8 wherein the UDM is further configured to receive the UE registration notice for the UE and the SMSF from the SMSF and responsively transfer the UE registration notice to the HSS without the HSS previously subscribing to the UDM for delivery of the UE registration notice.

11. The wireless communication network of claim 8 wherein:
the UE detaches from the wireless communication network after receiving the data message;
the SMSF is further configured to deregister the UE in response to the UE detaching from the wireless communication network and in response, write a UE deregistration notice for the UE and the SMSF to the UDR;
the UDR is further configured to acknowledge the writing of the UE deregistration notice to the UDM;
the UDM is further configured to transfer a UE deregistration alert to the HSS in response to the acknowledging;
the HSS is further configured to receive the UE deregistration alert from the UDM and responsively transfer the UE deregistration alert to the SMSC; and
the SMSC is further configured to receive a subsequent data message for the UE, and in response, hold the subsequent data message for the UE in a queue based on the UE deregistration alert.

12. The wireless communication network of claim 11 wherein:
the UE reattaches to the wireless communication network subsequent to deregistration;
the SMSF is further configured to reregister the UE, and in response, transfer a new UE registration notice for the UE and the SMSF to the UDM;
the UDM is further configured to receive the new UE registration notice for the UE and the SMSF from the SMSF and responsively transfer the new UE registration notice to the HSS;
the HSS is further configured to receive the new UE registration notice and responsively transfer a new UE alert to the SMSC in response to the new UE registration notice;
the SMSC is further configured to receive the new UE alert from the HSS and responsively transfer a new SMSF request for the UE to the HSS;
the HSS is further configured to receive the new SMSF request for the UE from the SMSC and responsively transfer the new SMSF request for the UE to the UDR;
the UDR is further configured to receive the new SMSF request for the UE from the HSS and responsively transfer the SMSF identifier for the SMSF to the HSS;
the HSS is further configured to receive the SMSF identifier for the SMSF from the UDR and responsively transfer the SMSF identifier for the SMSF to the SMSC;
the SMSC is further configured to transfer the subsequent data message held in the queue to the SMSF based on the SMSF identifier; and
the SMSF is further configured to receive the subsequent data message, and in response, transfer the subsequent data message to the UE.

13. The wireless communication network of claim 8 wherein:
the wireless network circuitry is further configured to execute an Access and Mobility Management Function (AMF); and
the AMF is configured to register the UE, receive signaling from the UE that indicates the UE supports Short Message Service (SMS) service delivered by the SMSF, and register the UE with the SMSF based on the signaling.

14. The wireless communication network of claim 8 wherein the SMSF is further configured to transfer the data message to the UE via at least one of a Fifth Generation New Radio (5GNR) access node or a WiFi access node.

15. A method of operating a wireless communication network to transfer a data message to a User Equipment (UE), the method comprising:
an Access and Mobility Management Function (AMF) registering the UE, and in response, transferring a UE registration notice for the UE and the AMF to a Unified Data Management (UDM);
the UDM receiving the UE registration notice from the AMF and responsively transferring the UE registration notice to a Home Subscriber System (HSS);
the HSS receiving the UE registration notice, and in response, transferring a UE alert to a Message Center (MC) in response to the UE registration notice;
the MC receiving the UE alert from the HSS and responsively transferring an AMF request for the UE to the HSS;
the HSS receiving the AMF request for the UE from the MC and responsively transferring the AMF request for the UE to a Unified Data Repository (UDR);
the UDR receiving the AMF request for the UE from the HSS and responsively transferring an AMF identifier for the AMF to the HSS; and
the HSS receiving the AMF identifier for the AMF from the UDR and responsively transferring the AMF identifier for the AMF to the MC;
the MC receiving a data message for the UE, and in response, transferring the data message to the AMF based on the AMF identifier; and
the AMF receiving the data message, and in response, transferring the data message to the UE.

16. The method of claim 15 wherein the UDM receiving the UE registration notice for the UE and the AMF from the AMF and responsively transferring the UE registration notice to the HSS comprises the UDM receiving the UE registration notice and responsively transferring the UE registration notice to the UDR and responsively receiving an acknowledgement from the UDR, and in response to the acknowledgement from the UDR, transferring the UE registration notice to the HSS.

17. The method of claim 15 wherein the UDM receiving the UE registration notice for the UE and the AMF from the AMF and responsively transferring the UE registration notice to the HSS comprises the UDM receiving the UE registration notice for the UE and the AMF from the AMF and responsively transferring the UE registration notice to the HSS without the UDM previously subscribing to the AMF for delivery of the UE registration notice.

18. The method of claim 15 wherein the UE detaches from the wireless communication network after receiving the data message; and further comprising:

the AMF deregistering the UE in response to the UE detaching from the wireless communication network and in response, writing a UE deregistration notice for the UE and the AMF to the UDR;
the UDR acknowledging the writing of the UE deregistration notice to the UDM;
the UDM transferring a UE deregistration alert to the HSS in response to the acknowledging;
the HSS receiving the UE deregistration alert from the UDM and responsively transferring the UE deregistration alert to the MC; and
the MC receiving a subsequent data message for the UE, and in response, holding the subsequent data message for the UE in a queue based on the UE deregistration alert.

19. The method of claim 18 wherein the UE reattaches to the wireless communication network subsequent to deregistration; and further comprising:
the AMF reregistering the UE, and in response, transferring a new UE registration notice for the UE and the AMF to the UDM;
the UDM receiving the new UE registration notice for the UE and the AMF from the AMF and responsively transferring the new UE registration notice to the HSS;
the HSS receiving the new UE registration notice and responsively transferring a new UE alert to the MC in response to the new UE registration notice;
the MC receiving the new UE alert from the HSS and responsively transferring a new AMF request for the UE to the HSS;
the HSS receiving the new AMF request for the UE from the MC and responsively transferring the new AMF request for the UE to the UDR;
the UDR receiving the new AMF request for the UE from the HSS and responsively transferring the AMF identifier for the AMF to the HSS;
the HSS receiving the AMF identifier for the AMF from the UDR and responsively transferring the AMF identifier for the AMF to the MC;
the MC transferring the subsequent data message held in the queue to the AMF based on the AMF identifier; and
the AMF receiving the subsequent data message, and in response, transferring the subsequent data message to the UE.

20. The method of claim 15 wherein the AMF transferring the data message to the UE comprises the AMF transferring the data message to the UE via at least one of a Fifth Generation New Radio (5GNR) access node or a WiFi access node.

* * * * *